(12) United States Patent
Keyser et al.

(10) Patent No.: US 7,177,489 B2
(45) Date of Patent: Feb. 13, 2007

(54) SILICON-INSULATOR-SILICON THIN-FILM STRUCTURES FOR OPTICAL MODULATORS AND METHODS OF MANUFACTURE

(75) Inventors: Thomas Keyser, Plymouth, MN (US); Cheisan J. Yue, Roseville, MN (US); Bradley J. Larsen, Mound, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/915,299

(22) Filed: Aug. 10, 2004

(65) Prior Publication Data

US 2005/0207691 A1    Sep. 22, 2005

Related U.S. Application Data (60) Provisional application No. 60/554,457, filed on Mar. 18, 2004.

(51) Int. Cl.
*G02B 1/01* (2006.01)
*G02B 6/10* (2006.01)
*H01L 21/302* (2006.01)

(52) U.S. Cl. ............................ 385/1; 385/129; 438/719
(58) Field of Classification Search .................... 385/1, 385/129; 438/31, 719, 766, 716
See application file for complete search history.

(56) References Cited

U.S. PATENT DOCUMENTS

| | | | |
|---|---|---|---|
| 4,886,345 A | 12/1989 | Popek | |
| 5,029,978 A | 7/1991 | Curtis et al. | |
| 5,383,048 A | 1/1995 | Seaver | |
| 5,500,544 A | 3/1996 | Park et al. | 257/296 |
| 5,696,662 A | 12/1997 | Bauhahn | 361/297.1 |
| 5,841,931 A * | 11/1998 | Foresi et al. | 385/131 |
| 6,108,212 A | 8/2000 | Lach et al. | 361/768 |
| 6,323,985 B1 | 11/2001 | Maloney | 359/248 |
| 6,372,609 B1 | 4/2002 | Aga et al. | |

(Continued)

FOREIGN PATENT DOCUMENTS

WO    WO 03/077015 A1    9/2003

(Continued)

OTHER PUBLICATIONS

Liu et al., "A High-Speed Silicon Optical Modulator Based on a Metal-Oxide-Semiconductor Capacity," Nature, vol. 427, Feb. 12, 2004. www.nature.com.
International Search Report dated May 18, 2006, PCT/US2005/028391.
International Search Report dated Feb. 24, 2006, PCT/US2005/028391.
Liu et al., "Fast Silicon Optical Modulator," Proceedings of the SPIE, SPIE, Bellingham, VA, vol. 5357, Jul. 2004, (Jul. 2004), pp. 35-44, XP002332586.

(Continued)

*Primary Examiner*—Sung Pak
*Assistant Examiner*—Tina M. Wong
(74) *Attorney, Agent, or Firm*—McDonnel Boehnen Hulbert & Berghoff LLP (57) ABSTRACT

The present invention provides silicon based thin-film structures that can be used to form high frequency optical modulators. Devices of the invention are formed as layered structures that have a thin-film dielectric layer, such as silicon dioxide, sandwiched between silicon layers. The silicon layers have high free carrier mobility. In one aspect of the invention a high mobility silicon layer can be provided by crystallizing an amorphous silicon layer. In another aspect of the invention, a high mobility silicon layer can be provided by using selective epitaxial growth and extended lateral overgrowth thereof.

57 Claims, 6 Drawing Sheets

U.S. PATENT DOCUMENTS

| | | |
|---|---|---|
| 6,418,999 B1 | 7/2002 | Yanagita et al. |
| 6,493,502 B1 | 12/2002 | Deliwala ............... 385/140 |
| 6,526,187 B1 | 2/2003 | Deliwala ................. 385/11 |
| 6,546,538 B1 | 4/2003 | Rubdi et al. ............. 716/12 |
| 6,603,166 B2 | 8/2003 | Fechner et al. |
| 6,603,889 B2 | 8/2003 | Deliwala ................... 385/8 |
| 6,608,945 B2 | 8/2003 | Deliwala ................... 385/2 |
| 6,611,636 B2 | 8/2003 | Deliwala .................. 385/14 |
| 6,625,348 B2 | 9/2003 | Deliwala .................. 385/27 |
| 6,646,747 B2 | 11/2003 | Deliwala ............... 356/477 |
| 6,654,511 B2 | 11/2003 | Deliwala |
| 6,658,173 B2 | 12/2003 | Delwala .................. 385/15 |
| 6,671,443 B2 | 12/2003 | Deliwala ............... 358/125 |
| 6,690,844 B2 | 2/2004 | Deliwala ................... 385/2 |
| 6,690,863 B2 | 2/2004 | Deliwala .................. 385/50 |
| 6,738,546 B2 | 5/2004 | Deliwala .................. 385/50 |
| 6,748,125 B2 | 6/2004 | Deliwala ................... 385/2 |
| 6,760,498 B2 | 7/2004 | Delwala .................. 385/14 |
| 6,823,112 B2 | 11/2004 | Deliwala .................. 385/37 |
| 6,826,320 B2 | 11/2004 | Deliwala .................. 385/14 |
| 6,842,546 B2 | 1/2005 | Deliwala .................. 385/14 |
| 6,845,198 B2 | 1/2005 | Montgomery et al. ....... 385/50 |
| 6,869,881 B2 | 3/2005 | Deliwala ............... 438/689 |
| 6,879,751 B2 | 4/2005 | Deliwala .................. 385/25 |
| 6,890,450 B2 * | 5/2005 | Naydenkov et al. .......... 216/24 |
| 6,891,685 B2 | 5/2005 | Deliwala et al. ........... 359/831 |
| 6,891,985 B2 | 5/2005 | Delwala .................. 385/14 |
| 6,895,136 B2 | 5/2005 | Deliwala .................. 385/14 |
| 6,897,498 B2 | 5/2005 | Gothoskar et al. .......... 257/226 |
| 6,898,352 B2 | 5/2005 | Deliwala .................. 385/40 |
| 6,912,330 B2 | 6/2005 | Deliwala .................. 385/14 |
| 6,917,730 B2 | 7/2005 | Ghiron et al. .............. 385/14 |
| 6,919,238 B2 * | 7/2005 | Bohr ..................... 438/166 |
| 6,934,444 B2 | 8/2005 | Ghiron et al. .............. 385/36 |
| 6,944,369 B2 | 9/2005 | Deliwala .................. 385/30 |
| 6,947,615 B2 | 9/2005 | Deliwala ................... 385/5 |
| 6,963,118 B2 | 11/2005 | Deliwala ................. 257/428 |
| 6,968,110 B2 | 11/2005 | Patel et al. ............... 385/131 |
| 6,980,720 B2 | 12/2005 | Gothoskar et al. ........... 385/43 |
| 6,987,910 B2 | 1/2006 | Shappir et al. ............. 385/37 |
| 6,993,225 B2 | 1/2006 | Patel et al. ................ 385/43 |
| 6,993,243 B2 | 1/2006 | Delwala ................. 385/147 |
| 7,000,207 B2 | 2/2006 | Gothoskar et al. ............ 716/8 |
| 7,013,067 B2 | 3/2006 | Ghiron et al. .............. 385/39 |
| 7,020,364 B2 * | 3/2006 | Ghiron et al. .............. 385/36 |
| 2002/0003650 A1 | 1/2002 | Usami et al. |
| 2003/0054639 A1 | 3/2003 | Deliwala ............... 438/689 |
| 2003/0063364 A1 | 4/2003 | Kambe |
| 2003/0081924 A1 * | 5/2003 | Yegnanarayanan et al. . 385/132 |
| 2003/0151793 A1 | 8/2003 | Sugiyama et al. |
| 2004/0002197 A1 | 1/2004 | Fathimulla et al. |
| 2004/0021157 A1 | 2/2004 | Yue et al. |
| 2004/0041232 A1 | 3/2004 | Keyser |
| 2004/0223768 A1 | 11/2004 | Shastri et al. ............... 398/183 |
| 2004/0240822 A1 | 12/2004 | Patel et al. ............... 385/130 |
| 2004/0258347 A1 | 12/2004 | Gothoskar et al. ............ 385/14 |
| 2005/0094938 A1 | 5/2005 | Ghiron et al. .............. 385/36 |
| 2005/0094939 A1 | 5/2005 | Ghiron et al. .............. 385/36 |
| 2005/0110108 A1 | 5/2005 | Patel et al. ............... 257/453 |
| 2005/0123232 A1 | 6/2005 | Piede et al. ............... 385/14 |
| 2005/0135727 A1 | 6/2005 | Piede et al. ............... 385/14 |
| 2005/0152658 A1 * | 7/2005 | Keyser ................... 385/129 |
| 2005/0179986 A1 | 8/2005 | Gothoskar et al. .......... 359/321 |
| 2005/0189591 A1 | 9/2005 | Gothoskar et al. .......... 257/347 |
| 2005/0194990 A1 | 9/2005 | Gothoskar et al. .......... 324/765 |
| 2005/0201683 A1 | 9/2005 | Ghirono et al. ............. 385/39 |
| 2005/0213873 A1 | 9/2005 | Piede et al. ............... 385/14 |
| 2005/0220405 A1 | 10/2005 | Shappir et al. ............. 385/37 |
| 2005/0236619 A1 | 10/2005 | Patel et al. ................ 257/57 |
| 2005/0289490 A1 | 12/2005 | Shastri et al. ................ 716/4 |
| 2006/0018597 A1 | 1/2006 | Piede et al. ................ 385/39 |
| 2006/0083144 A1 | 4/2006 | Piede et al. ............... 369/100 |

FOREIGN PATENT DOCUMENTS

| | | |
|---|---|---|
| WO | WO 2004/088394 | 10/2004 |
| WO | WO 2004/088394 A2 | 10/2004 |

OTHER PUBLICATIONS

Ahmed et al., "Nitrided Thermal SiO2 for Use as Top and Bottom Gate Insulators in Self-Aligned Double Gate Silicon-on-Insulator Metal-Oxide-Semiconductor Field Effect Transistor," Journal of Vacuum Science & Technology B (Microelectronics and Nanometer Structures) AIP for American Vacuum Soc., vol. 19, No. 3, May 2001 (May 2001), pp. 800-806, XP012008790.

Ahmed et al., "Ntrided Theram SiO2 for Thin Buried Gate Insulator in Dual Gate SOI-MOSFET," University/Government/Industry Microelectronics Symposium, 1999. Proceedings of the Thirteenth Biennial Minneapolis, MN Jun. 20-23, 1999, Piscatatway, NJ, USA, IEEE, US, Jun. 20, 1999 (Jun. 20, 1999), pp. 43-46, XP010345902.

Png C. E., et al., "Development of Small Silicon Modulators in Silicon-on-Insulator (SOI)," Proceedings of the SPIE, SPIE, Bellingham, VA, US, vol. 4997, 2003, pp. 190-197, XP002329753.

U.S. Appl. No. 60/458,501, filed Mar. 28, 2003, Patel et al.

U.S. Appl. No. 60/457,242, filed Mar. 25, 2003, Montgomery et al.

U.S. Appl. No. 60/464,491, Apr. 21, 2003, Patel et al.

4 pgs, "A high-speed silicon optical modulator based on metal-oxide-semiconductor capacitor," Ansheng Liu et al., NATURE, vol. 427, (Feb. 12, 2004), 615-618.

4 pgs, "Strained Silicon on Insulator. A Quick Guide to the Technology, the Processes, the Products," George Celler, Chief Scientist and Michael Wolf, Sr. VP Sales & Marketing, SOITEC, Jul. 2003, 1-4.

8 pgs, "Smart Cut™. A guide to the Technology, the Process, the Products," George Celler, Chief Scientist and Michael Wolf, Sr. VP, Sales & Marketing, SOITEC, Jul. 2003, 1-8.

7 pgs, "Design Methodology of the High Performance Large-Grain Polysilicon MOSFET," Singh Jagar et al., IEEE Transactions on Electron Devices, vol. 49, No. 5, May 2002, 795-801.

1 pg, "Optical Transmission Losses in Polycrystalline Silicon Strip Waveguides: Effects of Waveguide Dimensions, Thermal Treatment, Hydrogen Passivation, and Wavelength," Ling Liao et al., Journal of Electronic Materials, vol. 29, No. 12, 2000, 1380.

U.S. Non-Provisional Patent Application; filed even date herewith, entitled, "Low Loss Contact Structure for Silicon Based Optical Modulators and Methods of Manufacture", Applicant: Thomas Keyser et al.

U.S. Non-Provisional Patent Application; filed even date herewith, entitled, "Bonded Thin-Film Structures for Optical Modulators and Methods of Manufacture", Applicant: Cheisan J. Yue et al.

Liu et al., "A High-Speed Silicon Optical Modulator Based on a Metal-Oxide-Semiconductor Capacitor," Nature, Nature Publishing Group, London, GB, vol. 427, Feb. 12, 2004, pp. 615-618.

Liu et al., "Fast Silicon Optical Modulator," Proceedings of the SPIE, SPIE, Bellingham, VA, vol. 5357, Jul. 2004, pp. 35-44.

Ahmed et al., "Nitrided Thermal SiO2 for Use as Top and Bottom Gate Insulators in Self-Aligned Double Gate Silicon-on-Insulator Metal-Oxide-Semiconductor Field Effect Transistor," Journal of Vacuum Science & Technology B (Microelectronics and Nanometer Structures) AIP for American Vacuum Soc., vol. 19, No. 3, May 2001, pp. 800-806.

Ahmed et al., "Ntrided Theram SiO2 for Thin Buried Gate Insulator in Dual Gate SOI-MOSFET," University/Government/Industry Microelectronics Symposium, 1999. Proceedings of the Thirteenth Biennial Minneapolis, MN Jun. 20-23, 1999, Piscatatway, NJ, IEEE, Jun. 20, 1999, pp. 43-46.

Png et al., "Development of Small Silicon Modulators in Silicon-on-Insulator (SOI)," Proceedings of the SPIE, SPIE, Bellingham, VA, vol. 4997, 2003, pp. 190-197.

International Search Report for PCT/US2005/028391 dated Feb. 24, 2006.

* cited by examiner

SILICON-INSULATOR-SILICON THIN-FILM STRUCTURES FOR OPTICAL MODULATORS AND METHODS OF MANUFACTURE

This application claims the benefit of U.S. Provisional Application Ser. No. 60/554,457, filed Mar. 18, 2004, entitled "Silicon Based Optical Modulators and Methods of Manufacture," which disclosure is incorporated herein by reference in its entirety for all purposes.

TECHNICAL FIELD

The present invention relates to silicon based optical modulators for optical transmission systems. More particularly, the present invention relates to silicon based thin-film phase-shifter structures for use in optical modulators and methods of making such structures.

BACKGROUND

The state of the art in optical communication networks, particularly that related to photonics based components for use in such networks, has advanced rapidly in recent years. Present applications require, and future application will demand, that these communication systems have the capability to reliably transfer large amounts of data at high rates. Moreover, because these networks need to be provided in a cost efficient manner, especially for "last mile" applications, a great deal of effort has been directed toward reducing the cost of such photonic components while improving their performance.

Typical optical communications systems use fiber optic cables as the backbone of the communication system because fiber optics can transmit data at rates that far exceed the capabilities of wire based communication networks. A typical fiber optic based communication network uses a transceiver based system that includes various types of optoelectronic components. Generally, a transceiver includes a light source, means to convert an electrical signal to an optical output signal, and means to convert an incoming optical signal back to an electrical signal. A laser is used to provide the source of light and a modulator is used to turn the light source into an information bearing signal by controllably turning the light on and off. That is, the modulator converts the light from the laser into a data stream of ones and zeroes that is transmitted by a fiber optic cable. The incoming optical signal can be converted back to an electrical signal by using components such as amplifiers and photodetectors to process the signal.

Commercially used optical modulators are either lithium niobate based devices or compound semiconductor based devices such as the III–V based devices that use gallium arsenide or indium phosphide material systems. Additionally, silicon based devices have been developed. However, silicon based optical modulator technology has not been able to provide a device that can perform like the commercially available products and many problems need to be solved before such silicon based devices can compete with the commercially available lithium niobate and compound semiconductor devices.

Lithium niobate devices rely on an electrooptic effect to provide a modulating function. That is, an electric field is used to change the refractive index of the material through which the light is traveling. These devices are usually provided as a Mach-Zehnder interferometer. In this type of modulator, an incoming light source is divided and directed through two separate waveguides. An electric field is applied to one of the waveguides, which causes the light passing through it to be out of phase with respect to the light in the other waveguide. When the light emerges from both waveguides and recombines, it interferes destructively, effectively turning the light off.

In contrast, compound semiconductor based devices rely on an electroabsorption effect. In this type of modulator an applied electric field is also used, but not to vary the refractive index of the material through which the light is propagating. In a compound semiconductor material, an electric field can be used to shift the absorption edge of the material so that the material becomes opaque to a particular wavelength of light. Therefore, by turning the electric field on and off, the light can be turned on and off.

One problem with lithium niobate based modulators is that as the data transfer rate increases for these devices, so must the size of the device itself. This requires more material, which can increase cost. These modulator devices are often integrated into packages with other components where the demand for smaller package sizes is continually increasing. Therefore, modulator size is a concern. Another problem with lithium niobate based devices is that the drive voltage can be somewhat high as compared to compound semiconductor devices. Accordingly, because a large voltage change between the on and off state is more difficult to produce than a lower voltage swing, the drive electronics required to provide such large voltage changes are typically relatively expensive and can introduce more cost to the systems.

Compound semiconductor modulator devices can be made extremely small and are not limited by the size restrictions of lithium niobate based devices. Moreover, these devices can handle high data transfer rates at relatively low drive voltages. However, current compound semiconductor based modulators, such as those fabricated from the indium phosphide material system, have certain limitations. In particular, these devices can suffer from problems related to coupling losses and internal absorption losses, which are generally not present in lithium niobate based devices.

As an additional concern, the processing and manufacture of compound semiconductor based devices is expensive when compared to silicon based devices, for example. One reason for this is that many of the base materials used for compound semiconductor processing are expensive and difficult to handle. For example, indium phosphide wafers are presently limited in size and the largest wafers are expensive. This makes low cost high volume manufacturing difficult as compared to that which can potentially be obtained in the manufacture of silicon based devices.

Regarding silicon based technology, a silicon based modulator can be designed to function in a manner that is similar to the way a lithium niobate based device functions in that it changes the phase of the light passing through a waveguide. This phase change can be used in a Mach-Zehnder type device to form a modulator. More particularly, a silicon based device generally operates on the principle that a region of high charge concentration can be used to shift the phase of light in the waveguide. Importantly, the magnitude of the phase shift is proportional to the charge concentration and the length of the charged region in a direction in which the light travels. Thus, the ability to create a region of sufficient charge density to interact with the light is essential to be able to induce a phase change, especially one that can shift the phase by an amount suitable for use in a Mach-Zehnder type device.

In order to provide a charged region that can be used for phase shifting, these devices are known to use injection of electrons or depletion of holes in a diode or triode type device. In operation, a concentration of charge carriers can be provided in an active portion of a guiding region of a waveguide in these devices. One parameter that is important in a silicon based optical modulator is the speed in which a charged region can be created and subsequently dissipated. More particularly, the speed at which charge carriers can be generated as well as the speed at which charge carries can be removed (by recombination, for example) affects the speed at which modulation can be performed. These generation and recombination processes are directly related to the mobility of the charge carriers in the particular material. Because these devices use both single crystal silicon and non-single crystal silicon and because the mobility of charge carriers in non-single crystal silicon is significantly lower than the mobility of charge carriers in single crystal silicon, the low mobility non-single crystal material unfortunately limits the rate at which the device can modulate light.

SUMMARY

The present invention thus provides silicon based thin-film structures that are capable of rapidly creating and removing a charged region for shifting the phase of light passing through the structure. In accordance with the present invention, high frequency optical modulators can be formed using silicon-insulator-silicon thin-film structures. In order to provide a charged region for phase shifting, in accordance with the present invention, devices of the present invention are preferably formed as layered structures that have an insulator layer, such as silicon dioxide, sandwiched between silicon layers. A concentration of charge carriers can be provided in a region adjacent to each silicon/oxide interface by applying an electrical bias across the silicon layers. This effectively moves charge carriers from the bulk silicon material toward the oxide layer so they build up in a region near the interface.

One parameter that is important in this type of device is the speed in which a charged region can be created. This speed is directly related to the mobility of the charge carriers in the particular material. Therefore, in one embodiment, a high performance device can be provided when both silicon layers comprise high-mobility silicon such as crystalline silicon. High mobility material is particularly preferred for the active portion of the waveguide of the device. Moreover, to function as an optical modulator, such devices preferably include structure of appropriate materials for rapidly altering the free carrier concentration across the optical path of a waveguide and preferably the structure is defined to confine and guide the light through the waveguide without degrading or attenuating the signal.

The present invention provides silicon-insulator-silicon structures for optical modulators having first and second silicon layers with each preferably comprising active regions comprising high free carrier mobility silicon. Such silicon-insulator-silicon structures are desirable for high speed optical signal modulation (greater than $1\times10^9$ hertz, for example). Preferably, silicon that has a bulk free carrier mobility of at least 500 centimeters$^2$/volt-second (cm$^2$/V-s) at room temperature (if n-type silicon is used) and at least 200 cm$^2$/V-s at room temperature (if p-type silicon is used) is provided as starting material to form a thin-film optical modulator structure in accordance with one aspect of the present invention. That is, this high mobility silicon may be provided and further doped to form an active region of a silicon layer for an optical modulator structure, which doping can change, and typically lowers, the mobility of the active region from the initial value. Preferably, such an active region is doped to a level sufficient to achieve the desired modulation performance. In any case, the doped active region is considered to have a high free carrier mobility in accordance with the present invention if it is formed from a material that has a free carrier mobility as set forth above.

It has been estimated that speeds in excess of $1\times10^9$ hertz and as high as or greater than $10\times10^9$ hertz can be realized when the active region of the second silicon layer has a mobility that is at least 20%–25% of the mobility of the active region of the first silicon layer. Accordingly, the second silicon layer is preferably formed from silicon material that has a mobility that is at least 20%–25% of the mobility of the material that is used to form the first silicon layer. To further improve the modulation performance, it is preferable to have the second layer mobility at about 50%, and most preferably close to 100%. Thus, the initial silicon material for forming the active region of the second silicon layer preferably has a mobility of about 50%, and most preferably close to 100% of the initial silicon material for the active region of the first silicon layer.

Accordingly, in one aspect of the present invention, a method of forming a silicon based thin-film structure for an optical modulator is provided. In accordance with the method, a substrate comprising a silicon-on-insulator structure is preferably provided as a base structure. The silicon-on-insulator structure preferably includes a first silicon layer and a buried oxide layer. A thin-film dielectric layer is preferably deposited on at least a portion of the first silicon layer of the substrate to a predetermined thickness. A second silicon layer is then preferably deposited on the thin-film dielectric layer to create a functional electrical device in the manner of a capacitor (as opposed to isolation of the silicon layers by the insulating layer). To increase mobility of the deposited second silicon layer, the second silicon layer is preferably at least partially crystallized. Additionally, a waveguide having a guiding region is preferably created within such structure. Preferably, the waveguide comprises at least portions of the first silicon layer, the thin-film dielectric layer, and the second silicon layer.

In accordance with another aspect of the present invention, a method of forming a silicon based thin-film structure for an optical modulator is provided. In accordance with this method, a substrate comprising a silicon-on-insulator structure is provided to provide a first silicon layer as a component of a functional electrical device. The silicon-on-insulator structure preferably includes the first silicon layer and a buried oxide layer. A thin-film dielectric layer is preferably deposited on at least a portion of the first silicon layer of the substrate to a predetermined thickness. A second silicon layer is then selectively epitaxially grown and the epitaxial growth is preferably laterally extended so that the second silicon layer grows over at least a portion of the thin-film dielectric to form an overgrowth portion of the second silicon layer. The structure comprising the overgrowth portion of the second silicon layer as it overlies the thin-film dielectric layer and the first silicon layer together create the structure for an optical modulator as an electrical device, and within which a waveguide can be defined.

In accordance with another aspect of the present invention, a method of forming a silicon based thin-film structure for an optical modulator is provided. In accordance with this method, a substrate comprising a silicon-on-insulator structure is preferably provided to provide a first silicon layer as a component of a functional electrical device. The silicon-on-insulator structure preferably includes the first silicon layer and a buried oxide layer. Preferably, a waveguide with a guiding region is created that is capable of guiding light in a propagation direction and that extends for a predetermined distance in the propagation direction. To create the waveguide, a thin-film dielectric layer is preferably deposited on the first silicon layer of the substrate to a predetermined thickness. A second silicon layer is preferably selectively epitaxially grown by growing the second silicon layer from a seed region of the first silicon layer that is outside of the guiding region of the waveguide. Also, the epitaxial growth of the second silicon layer is preferably laterally extended so that the second silicon layer grows over at least a portion of the thin-film dielectric to form an overgrowth portion of the second silicon layer.

In accordance with another aspect of the present invention, a silicon based thin-film structure for an optical modulator is provided. The silicon based structure preferably comprises first and second silicon layers and a thin-film dielectric layer between them, within which a waveguide can be created. A silicon-on-insulator structure is preferably provided that includes the first silicon layer and a buried oxide layer. The thin-film dielectric layer preferably has a predetermined thickness based upon its functionality as an optical modulator and is formed on the first silicon layer of the substrate. Preferably, the second silicon layer overlies at least a portion of the thin-film dielectric to form a silicon-insulator-silicon structure. The waveguide preferably has a guiding region and comprises at least a portion of the first silicon layer, the thin-film dielectric layer, and the second silicon layer. Also, the second silicon layer is preferably at least partially crystallized within at least a portion of the guiding region of the waveguide.

In yet another aspect of the present invention, a silicon based thin-film structure for an optical modulator is provided. The thin-film optical modulator structure comprises a silicon-insulator-silicon thin-film structure that is functional to cause light energy phase shifting. The silicon-insulator-silicon thin-film structure comprises a dielectric layer sandwiched between first and second silicon layers. The first silicon layer preferably has a free carrier mobility. The second silicon layer preferably has a free carrier mobility that is at least 20% of the free carrier mobility of the first silicon layer wherein the optical modulator structure is capable of being switched at a frequency of at least $1 \times 10^9$ hertz.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
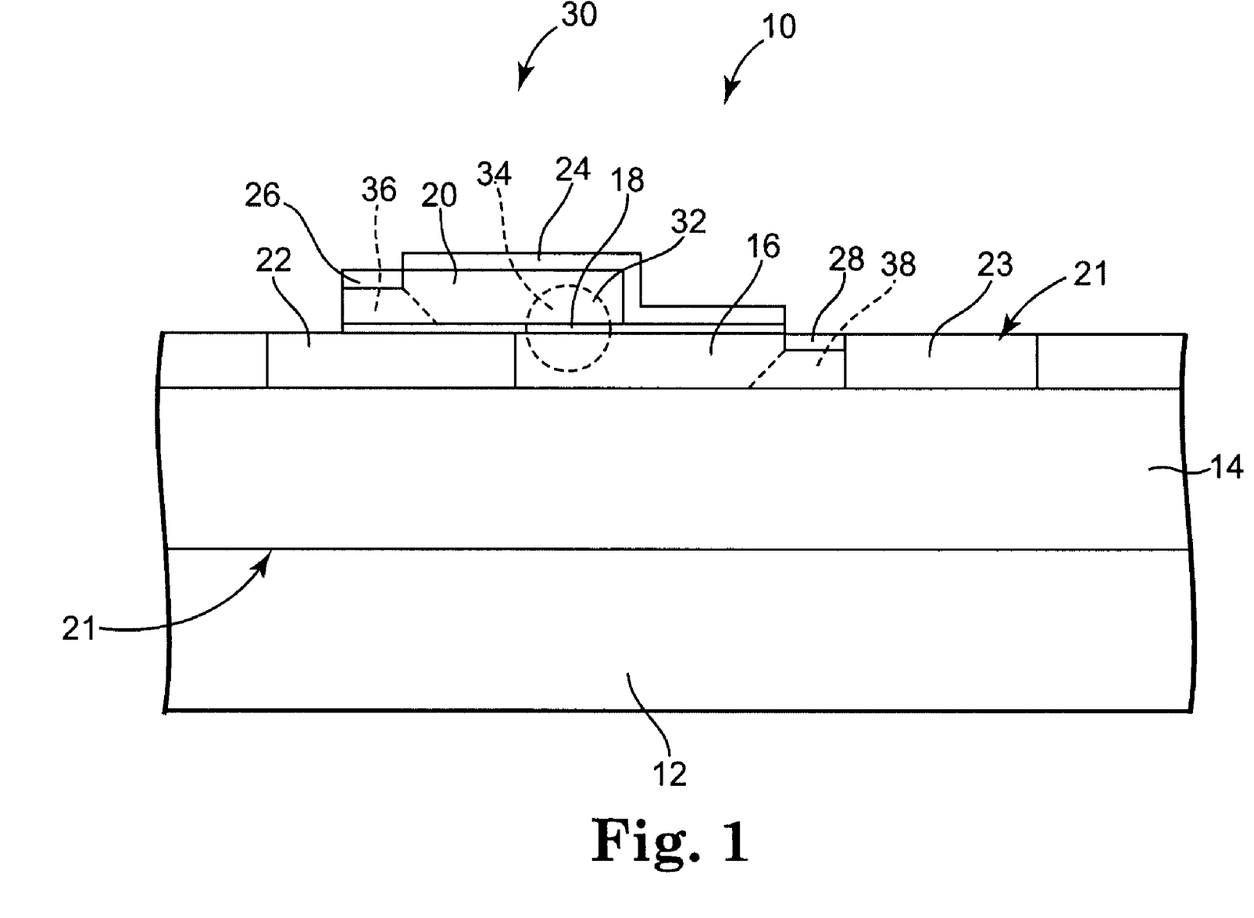
FIG. 1 is a schematic cross-sectional view of an exemplary layered thin-film silicon-insulator-silicon structure in accordance with the present invention that can be used to form an optical modulator.

In FIG. 1, a first embodiment of an optical modulator 10 in accordance with the present invention is schematically illustrated in cross-section. As shown, the optical modulator 10 includes a substrate 12, preferably silicon, an insulator that preferably comprises buried oxide layer 14, and a first silicon layer 16. Preferably, the first silicon layer 16 and the buried oxide layer 14 are provided as a silicon-on-insulator structure, as conventionally known. However, the modulator 10 does not require use of silicon-on-insulator technology and may be formed by other techniques including in particular those described below. Silicon-on-insulator structures are preferred because of their compatibility with conventional complementary metal oxide semiconductor (CMOS) processing. As such, the optical functionality of an optical modulator (which itself is an electro-optical device) can be integrated with the electrical functionality of devices such as transistors, resistors, capacitors, and inductors on the same substrate. These electro-optical and electrical devices can be formed by using the common processing techniques to provide optical circuits that are integrated with electrical circuits. Moreover, silicon-on-insulator technology provides an easy way to provide a high quality single crystal layer and to electrically isolate plural devices that can be formed in the silicon layer from each other.

The modulator 10 also preferably includes a thin-film dielectric layer 18 sandwiched between the first silicon layer 16 and a second silicon layer 20. In one preferred embodiment, the thin-film dielectric layer 18 comprises a silicon dioxide layer. Also, the first silicon layer 16 preferably comprises an electrically isolated layer. That is, the silicon layer 16 is preferably surrounded by an insulating material in order to laterally and vertically isolate the silicon layer 16. Preferably, as described in more detail below, a silicon-on-insulator substrate is used and a conventionally known shallow trench isolation process can be used to laterally isolate the silicon layer 16 from other adjacent devices formed on the same substrate. The buried oxide layer of the silicon-on-insulator structure can thus provide vertical isolation. As such, the silicon layer 16 (or silicon island) can be structurally isolated by the thin-film dielectric layer 18 and a surrounding oxide filled trench 21, which includes portions 22 and 23 that can be seen in cross-section.

Although preferred, silicon-on-insulator technology does not need to be used. Any conventionally known or future developed technique capable of functioning in the same manner to sufficiently isolate device structures for forming high frequency optical modulators in accordance with the present invention can be used. In particular, such structures generally require sufficient lateral as well as horizontal isolation to functionally isolate devices from each other. For example, it is contemplated that conventionally known techniques such as deep trench isolation or local oxidation of silicon (LOCOS) can be used to laterally isolate device structures. Regarding vertical isolation, any technique that is conventionally known or future developed for sufficiently vertically isolating the silicon layer 16 in accordance with the present invention may be used.

An oxide layer 24 is also preferably provided, as illustrated, and is preferably designed in order to at least partially define a waveguide 30 that extends for a predetermined distance in a direction of propagation of an electromagnetic field through the waveguide 30. That is, the oxide 24 preferably assists to confine light in the waveguide 30. A propagating electromagnetic field is also referred to as light herein. As shown, the waveguide 30 is preferably at least partially defined by the thin-film dielectric 18 and the first and second silicon layers 16 and 20, respectively.

The waveguide 30 functions to confine and guide light propagating through a guiding region 32 of the waveguide 30. In order to illustrate this guiding and confining functionality, a mode 34 of an electromagnetic field that can propagate through the guiding region 32 of the waveguide 30 is illustrated schematically. More specifically, the waveguide 30 is preferably designed for single mode transmission. That is, the waveguide 30 is preferably designed so that the lowest order bound mode (also called the fundamental guided mode or trapped mode) can propagate at the wavelength of interest. For typical optical communications systems, wavelengths in the near infra-red portion of the electromagnetic spectrum are typically used. For example, wavelengths around 1.55 microns are common.

Thin-film structures and techniques for designing such structures for optical waveguides are well known and any structure capable of confining and guiding light in accordance with the present invention can be used. For example, such waveguides may include interfaces between thin-film materials having different refractive index, which interfaces can be used in order to guide and confine light in accordance with the present invention. Moreover, graded index regions, such as can be formed by controllably varying the composition of a material, may be used to guide and confine light as is well known.

The first silicon layer 16, the thin-film dielectric layer 18, and the second silicon layer 20 are also preferably designed to be capable of modulating light that is traveling through the guiding region 32 of the waveguide 30. More specifically, at least a portion of the guiding region 32 of the waveguide 30 is preferably designed to include an active region. Accordingly, the first silicon layer 16 and the second silicon layer 20 are preferably operatively doped to form active regions (or doped regions) in the first and second silicon layers 16 and 20. Preferably, the first and second silicon layers, 16 and 20, are doped in a region or area where it is desired to rapidly alter the free carrier concentration across the optical path of the light propagating through the guiding region 32 of the waveguide 30. As described below, the silicon layer 16 can be p-type and the silicon layer 20 can be n-type or vice versa. Preferably, the active regions are sufficiently doped in order to achieve a desired modulation or switching speed.

Also, the modulator 10 preferably includes a first electrical contact 26 for providing a contact to the silicon layer 20 and a second electrical contact 28 for providing a contact to silicon layer 16. As shown the contacts 26 and 28 are preferably spaced apart from the active portion of the guiding region 32 in order to minimize optical losses that can be caused by metals as are preferably used in such contacts. Low loss contact structures and methods of forming such contacts that can be used in accordance with the present invention are disclosed in commonly owned co-pending U.S. patent application Ser. No. 10/915,607, entitled LOW LOSS CONTACT STRUCTURES FOR SILICON BASED OPTICAL MODULATORS AND METHODS OF MANUFACTURE, filed on even date herewith, the entire disclosure of which is fully incorporated herein by reference for all purposes.

Preferably, the contacts 26 and 28 are formed as low resistance ohmic contacts wherein current varies linearly with applied voltage. Accordingly, the second silicon layer 20 preferably includes a highly doped region 36 that at least partially forms the contact 26. For example, a highly doped region is preferably doped to between $5 \times 10^{17}/cm^3$ and $2 \times 10^{18}/cm^3$. Likewise, the first silicon layer 16 preferably includes a highly doped region 38 that at least partially forms the contact 28. The regions 36 and 38 are preferably doped to correspond with the doping of the respective silicon layer. That is, if the first silicon layer 16 is p-type, the region 38 is also preferably p-type. Similarly, if the second silicon layer 20 is n-type, the region 36 is also preferably n-type. Any contacts capable of providing an electrical bias to the guiding region 30, thereby forming an active region in accordance with the invention, are contemplated and can be used. Such ohmic contacts are well known by those in the art of complementary metal oxide semiconductor (CMOS) processing.

In operation, a phase shift can be produced in light passing through the waveguide 30 by applying an electrical bias across the structure. This bias activates the doped first and second silicon layers, 16 and 20, which thereby causes charge carriers to move toward the dielectric layer 18. In particular, contacts 26 and 28 can be used to provide a bias across the first and second silicon layers, 16 and 20, as the mode 34 passes through the guiding region 32 of the waveguide 30. Charge carriers in the active (doped) regions of the first and second silicon layers, 16 and 20, move toward the dielectric layer 18 and build up so as to provide regions of charge concentration that together can produce a phase shift in the light. This phase shift can be used to modulate light where the modulator 10 is provided as an arm of a Mach-Zehnder interferometer, for example.

The first and second silicon layers, 16 and 20, and the dielectric layer 18 form an optical device capable of providing a desired phase shift to light passing through the structure. The structure also functions like a capacitor, at least in the sense that charge carriers move toward the dielectric layer in response to an applied electric field. The structure is preferably not designed for use as a charge storage device (an electrical capacitor) because such a storage device may require contact metal positioned near the active portion of the device, which metal can cause optical losses. Moreover, the structure of the present invention preferably comprises a sandwich structure comprising active silicon (highly doped) layers rather than a body layer as used in a typical transistor.

As noted above, the first silicon layer 16 is preferably formed from a layer of a silicon-on-insulator structure because such silicon-on-insulator structures are readily available commercially with a top silicon layer that comprises a single crystal silicon layer, which can have a high free carrier mobility. For example, a high free carrier mobility is generally greater than at least 500 $cm^2/V$-s at room temperature for n-type silicon and at least 200 $cm^2/V$-s at room temperature for p-type silicon. It is noted that these values for free carrier mobility represent preferred values for the bulk material (or initial starting material) that is used to form the first silicon layer 16. That is, as described below, the first silicon layer 16 is preferably formed from an initial silicon material that has a high free carrier mobility and is subsequently doped to provide a functional device layer or active region for an optical modulator, which doping may change, typically by lowering, the free carrier mobility of a portion of the initial silicon layer. Accordingly, an active region of a device layer of an optical modulator in accordance with the present invention may have a free carrier mobility that is different from another portion of the same device layer. In any case, it is preferably to start with a silicon material that has a high free carrier mobility, as set forth above, and form an active region from (or in) that initial material.

In accordance with the present invention, the silicon layer 20 is preferably provided such that the silicon layer 20 has a free carrier mobility that is as close to the free carrier mobility of the silicon layer 16 as possible (as measured before doping to form active device layers for an optical modulator). For example, in one embodiment of an optical modulator, the silicon layer 20 can be formed as an amorphous silicon layer that is subsequently crystallized at least partially within the functional optical zone of such layer to provide improved free carrier mobility. In another embodiment of the invention, the silicon layer 20 can be formed with an effective crystal structure by selective epitaxial growth wherein extended lateral overgrowth of such selective epitaxial growth is used to provide the silicon layer 20 as such overlies at least some of the thin-film dielectric layer 18. Another technique for providing the silicon layer 20 is by using a bonding process as described in commonly owned co-pending U.S. Patent Application having Attorney Docket No. HON0011/US, entitled BONDED THIN-FILM STRUCTURES FOR OPTICAL MODULATORS AND METHODS OF MANUFACTURE, filed on even date herewith, the entire disclosure of which is fully incorporated herein by reference for all purposes.

Figure 2:
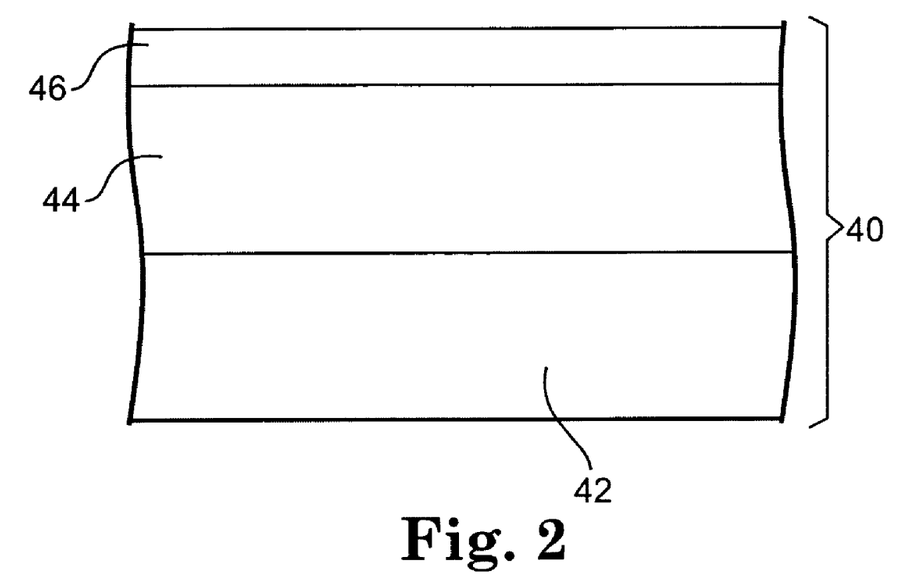
FIG. 2 is a schematic cross-sectional view of a silicon-on-insulator substrate that can be used to form a layered thin-film silicon-insulator-silicon structure in accordance with an embodiment of the present invention such as the layered thin-film silicon-insulator-silicon structure shown in FIG. 1.

Optical modulators in accordance with the present invention, such as the optical modulator 10 shown in FIG. 1, can be made as described below. Preferably, conventional CMOS processing techniques can be used although any other known or developed techniques can be used instead or in combination. Referring to FIG. 2, a silicon-on-insulator structure 40 that includes a substrate 42 (typically silicon), buried oxide layer 44, and first silicon layer 46 is illustrated. Such silicon-on-insulator substrates are commercially available. The thickness of the buried oxide layer 44 and the thickness of the silicon layer 46 are preferably selected by considering certain desired properties of the particular optical modulator to be made, such as the dimensions and/or structure of the device, as well as the processing techniques to be used. Also, the silicon layer 46 preferably has a high free carrier mobility. Preferably, if n-type silicon is used, the silicon layer 46 has a free carrier mobility of at least 500 $cm^2/V$-s at room temperature. If p-type silicon is used, the silicon layer 46 preferably has a free carrier mobility of at least 200 $cm^2/V$-s at room temperature.

Figure 6:
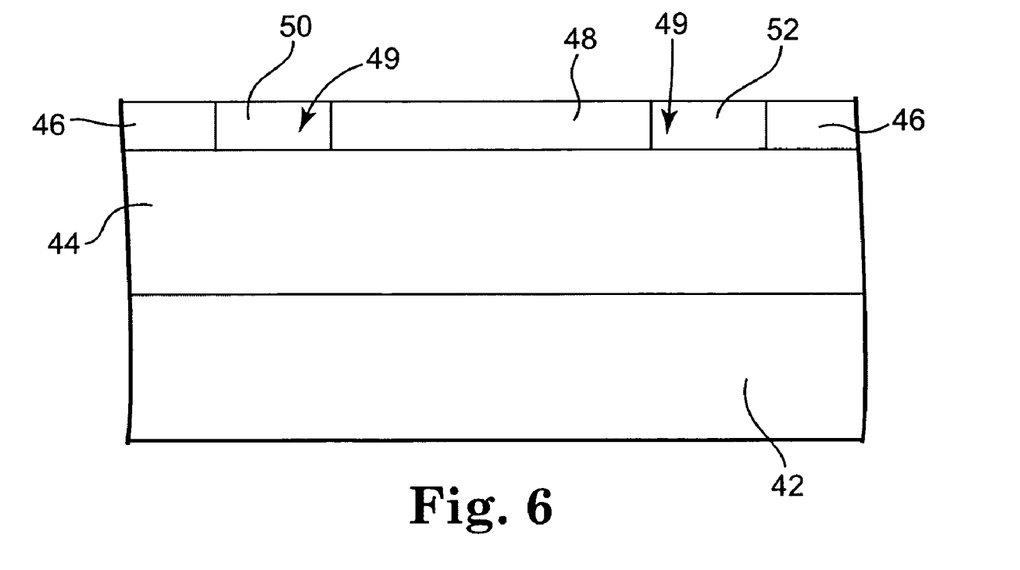
FIG. 6 is a schematic cross-sectional view of the layered structure of FIG. 5 after partial removal of the covering dielectric layer and removal of the thin-film etch stop layer, thus leaving a first electrically isolated silicon device layer having an exposed surface.

Preferably, a portion of the silicon layer 46 is electrically isolated to form a first device layer 48 as shown in FIG. 6. Such electrical isolation facilitates the formation of plural devices on the same substrate. In the illustrated embodiment, an oxide filled trench 49 is used to define the first device layer 48 by forming a border of dielectric material around the device perimeter. As shown in cross-section, the oxide trench 49 includes oxide portions 50 and 52 as part of the surrounding trench 49 that isolates the first device layer 48 from the remainder of silicon layer 46. The buried oxide layer 44 isolates the first device layer 48 from below so that an electrically isolated island of silicon can be created as the first device layer 48. This can be done, for example, by shallow trench isolation (STI) or local oxidation of silicon (LOCOS) procedures as known in conventional CMOS processing.

Figure 3:
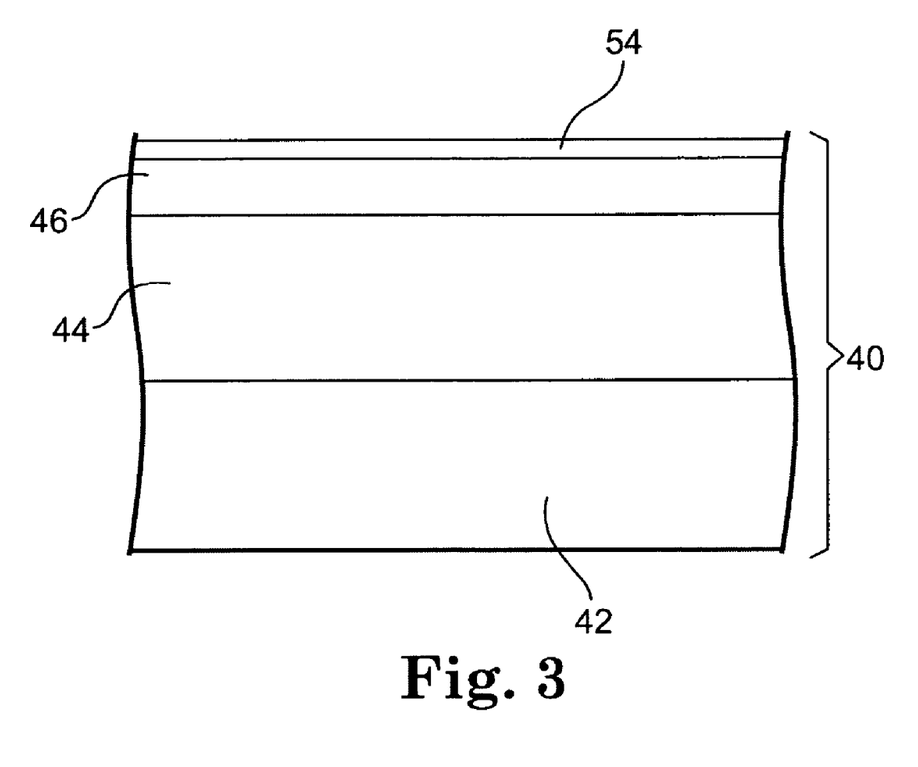
FIG. 3 is a schematic cross-sectional view of the silicon-on-insulator substrate of FIG. 2 showing in particular a thin-film etch stop layer that has been provided on a silicon layer of the silicon-on-insulator substrate to form a layered structure.
Figure 4:
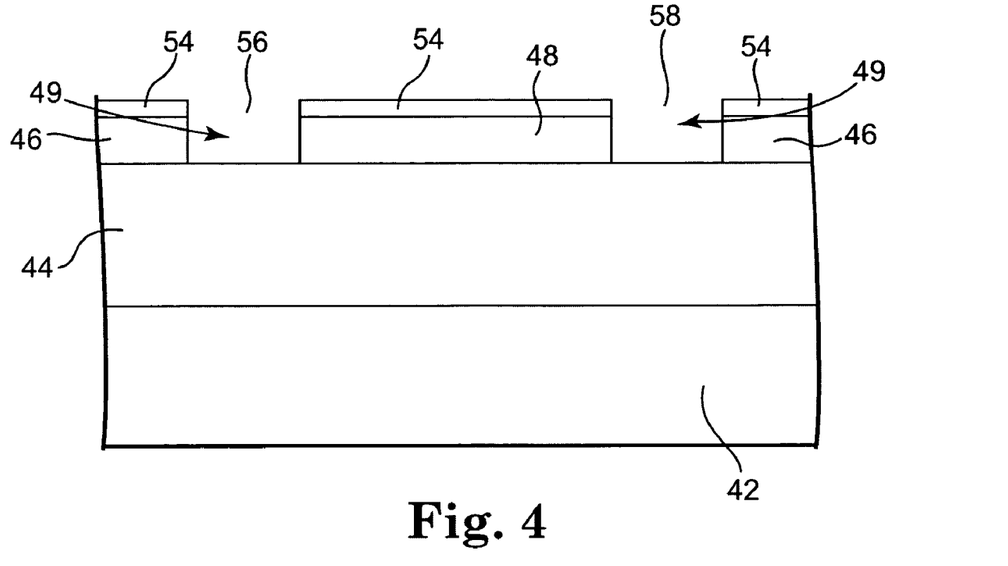
FIG. 4 is a schematic cross-sectional view of the layered structure of FIG. 3 showing in particular channels that are provided to isolate a portion of the silicon layer of the silicon-on-insulator structure in accordance with an aspect of the present invention.
Figure 5:
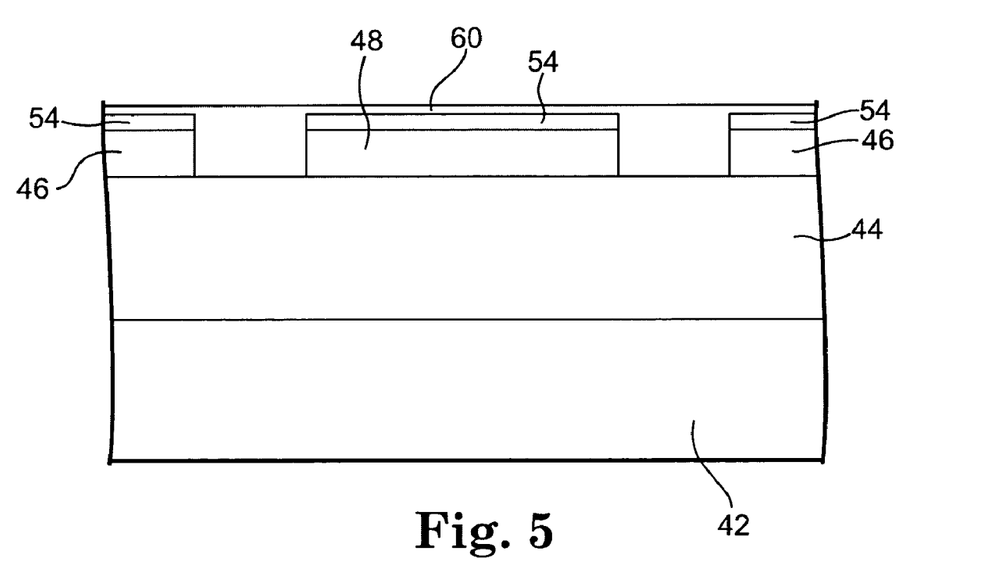
FIG. 5 is a schematic cross-sectional view of the layered structure of FIG. 4 with a thin-film dielectric layer covering the thin-film etch stop layer and filling the channels.

In a typical trench isolation process, an etch stop layer 54, (see FIG. 3) such as a silicon nitride layer, is first deposited on the silicon layer 46. Next, conventionally known masking and etching processes are used to form trench 49 as shown in FIG. 4 (trench portions 56 and 58 are shown in cross-section). The buried oxide layer 44, as shown, defines the depth of the trench 49. Accordingly, the trench 49 preferably defines the first device layer 48 as an island. An oxide layer 60 is then provided to fill the trench 49 as shown in FIG. 5, which step also may cover the etch stop layer 54, as shown. Next, the oxide layer 60 over the first silicon device layer 48 and silicon layer 46 of the structure shown in FIG. 5 can be planarized, such as by using chemical mechanical processing (CMP). Then, the etch stop layer 54 (which would preferably be relatively very thin) can be removed, such as by, for example, an acid bath that can selectively remove the etch stop layer 54 from the silicon layer 46 and the first device layer 48. The structure shown in FIG. 6 can thus be provided wherein the first device layer 48 is electrically isolated from the silicon layer 46 by the oxide trench 49 and the buried oxide layer 44. While shallow trench isolation with silicon-on-insulator technology is preferred, other techniques as described above, can be used. Moreover, any known or developed methods for planarizing or removing materials are contemplated, and such processes may be conducted by any number of combined steps of multiple varieties.

Preferably, the first device layer 48 is doped to form a p-type active region for an optical modulator but the first device layer 48 may be doped to form an n-type active region if desired. Such doping can be done before the trench 49 is formed or after the trench is formed; however, such doping is preferably performed in a manner that minimizes the possibility of undesirable thermal diffusion of dopant species. Dopants such as boron can be used to form p-type regions and dopants such as arsenic, phosphorus, and antimony can be used to form n-type active regions. Preferably, the first device layer 48 is doped sufficiently to provide a p-type material suitable for use in optical modulation. Conventionally known photolithography and ion implantation processes may be used, for example to perform the material doping. It is noted that such doping may change the free carrier mobility of the first device layer 48 such that it is different from the free carrier mobility of the initial silicon layer 46. In any case, it is preferred to start with a high mobility material such as the silicon layer 46 to form the first device layer 48. Additionally, as mentioned above, the first device layer is preferably sufficiently doped to form an active region capable of achieving the desired modulation performance. For example, by starting with the silicon layer 46 with the above noted free carrier mobility, an active region can be formed that is capable of achieving high modulation performance (greater that $1 \times 10^9$ hertz).

Figure 7:
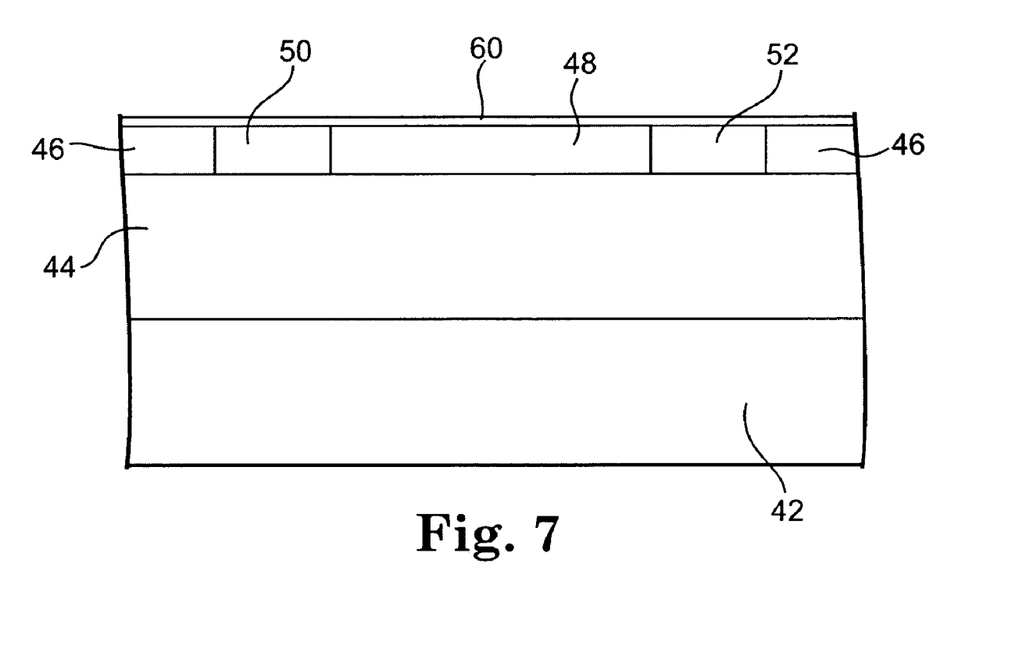
FIG. 7 is a schematic cross-sectional view of the layered structure of FIG. 6 with a functional thin-film dielectric device layer provided over the first silicon device layer.

Next, as shown in FIG. 7, a thin-film dielectric layer 60 is preferably deposited over the first device layer 48 and the oxide filled trench 49, as illustrated. The thin-film dielectric layer 60 provides a functional device layer portion over at least part of the first silicon device layer 48 for electro-optically creating an optical modulator. For example, silicon dioxide having a thickness that is preferably less than 100 angstroms may be thermally grown or deposited using conventional low pressure chemical vapor deposition (LPCVD). Moreover, the thin-film dielectric layer 48 may be formed from or include other dielectric materials, or combination thereof, such as silicon nitride, aluminum oxide, aluminum nitride, as well as those material generally characterized as titanates. Any deposition techniques may be used such as those including chemical vapor deposition, physical vapor deposition, and the like.

Figure 8:
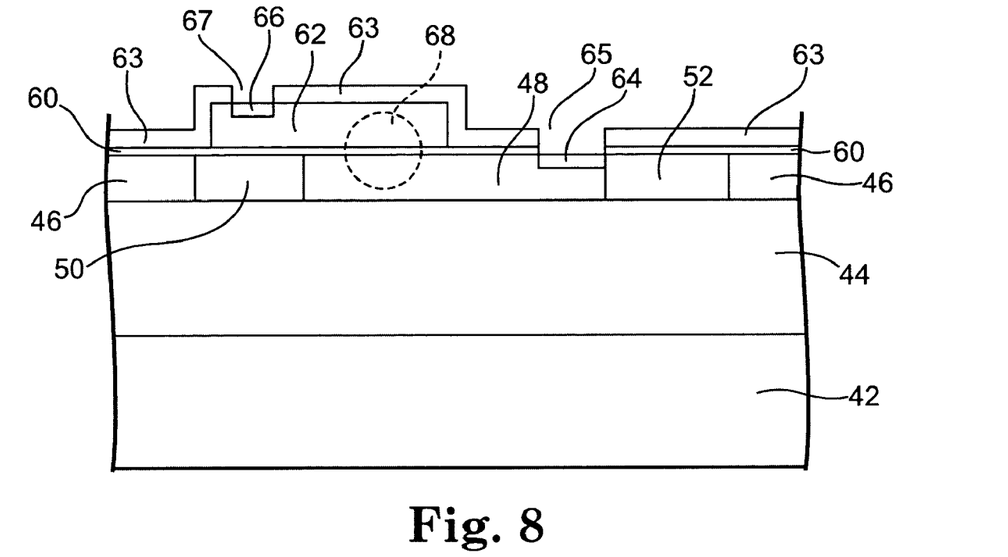
FIG. 8 is a schematic cross-sectional view of the layered structure of FIG. 7 showing a second silicon device layer overlying part of the thin-film dielectric layer and the first silicon device layer to form a thin-film silicon-insulator-silicon structure that, in accordance with the present invention, can be used to form an optical modulator.

After the thin-film dielectric layer 60 is deposited to a desired functional thickness, an amorphous silicon layer (or polycrystalline silicon layer) is then preferably deposited, patterned, doped, and at least partially crystallized to form a second silicon device layer 62, and to eventually (after structural processing) define a structure such as shown in FIG. 8 in accordance with an aspect of the present invention. In particular, at least a portion of second silicon device layer 48 that comprises a part of a functional optical modulator (where the first and second device layers 48 and 68 overlap with thin-film dielectric layer 60 in between) is crystallized as an effective single crystal structure for increased carrier mobility as described below in more detail. Patterning may be done by any known or developed silicon etching or removal technique to preferably create an island of silicon as the second device layer 62. Doping of the second device layer 62 may be done in any manner, such as described above with respect to first device layer 48 in order to achieve a desired modulation performance.

Additionally, a cap layer 63, such as silicon dioxide or the like is preferably formed over the patterned second device layer 62 as shown. The patterning, doping, and crystallizing steps can be performed in any desired order although the second device layer 62 is preferably at least partially crystallized before doping to minimize any potential diffusion effects of the dopant. Where the first device layer 48 is p-type, the second device layer 62 is therefore n-type, and vice versa. Preferably, the second device layer 62 is doped sufficiently to provide an n-type material suitable for use in optical modulation.

The silicon material (amorphous or polycrystalline) for the second device layer 62 can be deposited by any technique such as low pressure chemical vapor deposition, for example. The second device layer 62 is preferably patterned to create a structure wherein a portion of the first device layer 48 can be accessed for forming a contact 64 to the first device layer 48 such as illustrated. The contact 64 is preferably an ohmic contact and can be formed by conventionally known techniques that may include forming an opening 65 through the cap layer 63 and the dielectric layer 60 to provide access to a surface of the first device layer 48. The contact 64 is preferably created at a point sufficiently spaced from a guiding region 68 to minimize potential absorption related loss effects that can be caused by metal materials. The second device layer 62 is also preferably patterned to create a structure so that a contact 66 can be provided to the second device layer 62 and such that the contact 66 is also sufficiently spaced from the guiding region 68 to minimize potential absorption related loss effects that can be caused by such contacts. The contact 66 is also preferably an ohmic contact and can be formed by conventionally known techniques that may include forming an opening 66 in the cap layer 63 to provide access to the second device layer 62.

In accordance with an aspect of the present invention, the second device layer 62 is preferably thermally processed such as by using a furnace, epi reactor, rapid thermal processor, heated element, or laser system to at least partially crystallize the second device layer 62. Preferably, the second device layer 62 is at least partially crystallized so that a crystalline or polycrystalline region with enhanced carrier mobility can be provided in at least an active portion of the guiding region 68. Accordingly, the second silicon layer 62 is preferably formed from silicon material that has a mobility that is at least 20%–25% of the mobility of the material that is used to form the first device layer 48 (the silicon layer 46). To further improve the modulation performance, it is preferable to have the second silicon layer 62 mobility at about 50%, and most preferably close to 100%. Thus, the initial silicon material for forming the active region of the second silicon layer 62 preferably has a mobility of about 50%, and most preferably close to 100% of the initial silicon material for the active region of the first silicon layer 48.

Any process can be used that is capable of at least partially crystallizing a silicon layer, such as an amorphous silicon layer, to provide a desired mobility. Such crystallization can be done at any time after the second silicon layer is formed. Moreover, any process capable of improving the free carrier mobility of a silicon material, whether crystalline or not, may be used. Moreover, such a technique can be used to improve the crystallinity, such as by reducing defects or the like, of a crystalline, polycrystalline or partially crystalline silicon layer for the purpose of improving free carrier mobility. For example, crystallization of deposited silicon films by furnace, lamp, and laser techniques at a sufficient temperature and time to achieve a desired degree of crystallization can be used.

Figure 9:
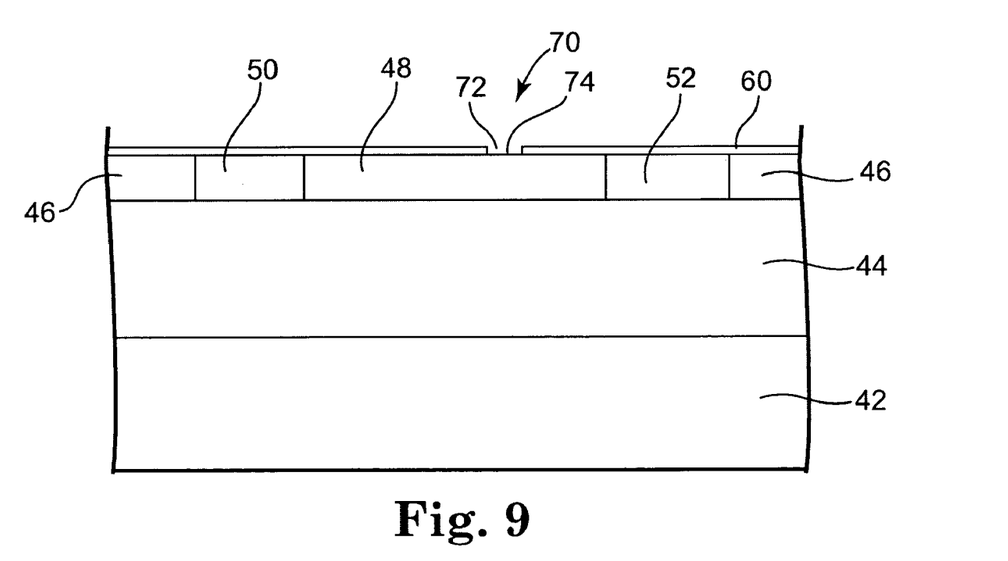
FIG. 9 is a schematic cross-sectional view of the layered structure of FIG. 7 provided with a seed region of the first silicon device layer that is exposed through the thin-film dielectric layer.
Figure 10:
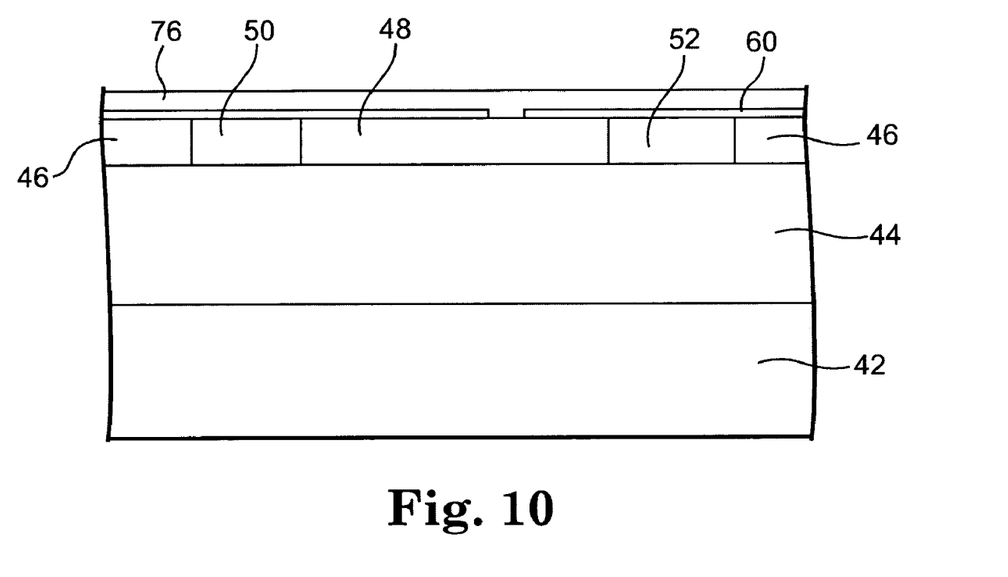
FIG. 10 is a schematic cross-sectional view of the layered structure of FIG. 9 further including a silicon layer provided on the thin-film dielectric layer and the seed region of the first silicon device layer.

In accordance with another aspect of the present invention, a seed region can be used to enhance crystallization of a silicon material. For example, referring to FIG. 9, a structure similar to that shown in FIG. 7 is illustrated with the added provision of a seed region 70. The seed region 70 comprises an opening 72 through the dielectric layer 60 that exposes a surface portion 74 of the first silicon device layer 48 and can be formed by any desired technique such as by patterning and etching with appropriate processes. The surface portion 74 preferably functions to enhance the silicon crystallization process of the second silicon device layer 62. That is, a silicon layer 76, such as amorphous silicon, can be deposited on the dielectric layer 60 and on the surface portion 74 as shown in FIG. 10. The silicon layer 76 can be thermally processed as described above in order to at least partially crystallize the silicon layer 76, preferably at least partially within the layer 76 portion that will comprise part of the functional guide region of an optical modulator. By providing the first device layer 48 and thus the surface portion 74 as a single crystal material (first device layer 48), a single crystal surface portion 74 can enable single crystal growth in the silicon layer 76 during the crystallization process. The single crystal surface portion 74 supports crystal development and further facilitates alignment of the developed crystals of the silicon layer 76 to those of the first device layer 48.

Figure 11:
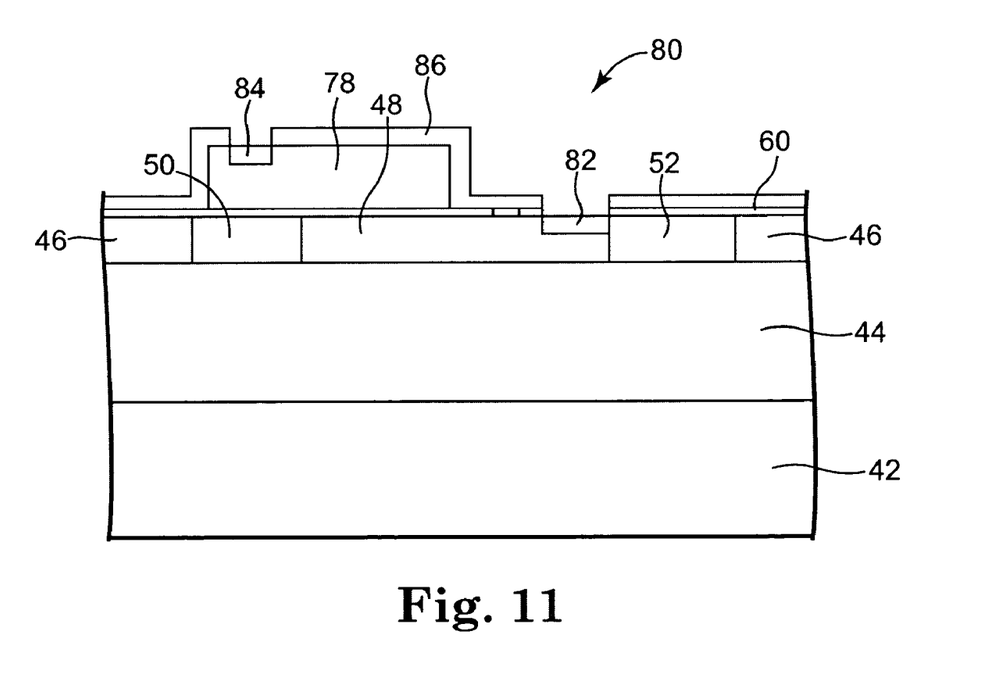
FIG. 11 is a schematic cross-sectional view of the layered structure of FIG. 10 provided with a second silicon device layer created from the silicon layer and which forms a thin-film silicon-insulator-silicon structure that, in accordance with the present invention, can be used to form an optical modulator.

After the silicon layer 76 is at least partially crystallized, the silicon layer 76 is preferably patterned to form a second device layer 78. The structure can then be further processed as described above to form an optical modulator structure 80 shown in FIG. 11. As shown, the structure 80 preferably also includes contacts 82 and 84, a cap layer 86, and a guiding region 88, each of which can be formed as described or suggested above. Alternatively, crystallization can be done after patterning to create the second device layer 78 with subsequent processing as desired.

The seed region 70 is preferably spaced from where the guiding region 88 will subsequently be located. This is done so that when the silicon layer 76 is patterned to create the second device layer 78, the second device layer 78 can be electrically isolated from the first device layer 48 to prevent the first and second device layers, 48 and 78 respectively, from shorting. As shown, in FIG. 11, the second device layer 78 is electrically isolated from the first device layer 48 by the thin film dielectric layer 60. Also, the opening 72 of the seed region 70 can be filled in by the cap layer 86. It is noted, however, that the seed region 70 can be located anywhere as long as the first and second device layers, 48 and 78, can eventually be electrically isolated in order to form a modulator device in accordance with the invention.

In another embodiment, metal-induced lateral crystallization (MILC) can be used to promote a crystallization process in an amorphous or partially crystalline silicon material. Metal-induced lateral crystallization of amorphous silicon thin-films as a process itself is well known. A typical MILC process includes first depositing an amorphous silicon layer to be subsequently crystallized. A low temperature oxide layer is then preferably deposited over the amorphous silicon layer. An opening, such as a channel, is formed in the low temperature oxide material to expose a surface portion of the amorphous silicon layer. Next, a metal thin-film is deposited so that the metal film covers the exposed surface portion of the amorphous silicon layer. As an example, nickel can be used. The structure is then heated by a suitable thermal process and the metal thin-film acts as a crystallization agent for causing crystallization of the amorphous silicon film.

In accordance with another aspect of the present invention, selective epitaxial growth can be used to initiate growth of an effective single crystal (or near single crystal) silicon layer. This process can be used to ultimately provide the second device layer 78 of the structure 80 shown in FIG. 11. Referring to FIG. 9, the surface portion 74 of the seed region 70 can function as an area for epitaxial growth. The silicon can start growing from the surface portion 74 and grow outward away from the surface 74 (in a direction perpendicular to surface portion 74). As the silicon layer continues to grow away from the surface, extended lateral overgrowth of the silicon can be used to provide a high quality silicon layer on the thin-film dielectric layer 60. Because the overgrown silicon layer is epitaxial in nature, its carrier mobility can be close to single crystal. Deposition temperature could be between 800 degrees Celsius to 1000 degrees Celsius depending on the system design. Systems for epitaxial growth are themselves well known, and any known or developed system capable of growth of silicon can be used.

The seed region 70 can be formed as described above and preferably comprises a channel that is adjacent to and spaced apart from the functional optical waveguide but positioned near enough to provide a layer have predetermined crystalline characteristics. Instead, a plurality of spaced openings can be used. In any case, the seed region 70 is preferably designed so that a crystalline overgrowth portion can be formed. The crystalline overgrowth portion can be used to eventually form the second device layer 78 including any other patterning or further steps, such as those suggested and described above. If desired, the seed region 70 can be designed so that the growth rate of the silicon in a direction perpendicular to the surface portion 74 and the growth rate of the silicon in a direction transverse thereto are similar. Accordingly, the seed region 70 can be aligned with a crystallographic orientation direction of the first silicon layer 48. For example, the seed region 70 can be formed as a channel that has a predetermined length and extends in a direction of extension. The direction of extension of the channel can be aligned with a crystallographic orientation direction of the first silicon layer 48.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A method of making a silicon based thin-film structure for an optical modulator, the method comprising the steps of:
   providing a substrate comprising at least a first silicon layer having a carrier mobility of at least 200 centimeters$^2$/volt-second at room temperature;
   providing a thin-film dielectric layer having a predetermined thickness on at least a portion of the first silicon layer of the substrate;
   providing a second silicon layer on at least a portion of the thin-film dielectric and overlying at least a portion of the first silicon layer to make an overlapped structure; and
   creating a waveguide within the overlapped structure comprising at least a partially crystalline device portion of the second silicon layer with at least a device portion of the first silicon layer and at least a portion of the thin-film dielectric layer so that when a voltage is applied across the waveguide, a phase shift can be produced to light energy propagating within the waveguide.

2. The method of claim 1, wherein the step of providing a second silicon layer comprises depositing an amorphous silicon layer on the thin-film dielectric layer.

3. The method of claim 2, further comprising at least partially crystallizing at least a portion of the amorphous silicon layer after depositing the amorphous silicon layer to create the partially crystalline device portion.

4. The method of claim 3, wherein the crystallizing is done by thermally annealing at least a portion of the amorphous silicon layer.

5. The method of claim 4, further comprising the step of providing an exposed seed surface of the first silicon layer before depositing the amorphous silicon layer on the thin-film dielectric layer.

6. The method of claim 5, wherein the step of providing an exposed seed surface comprises the providing of at least one opening through the thin-film dielectric layer.

7. The method of claim 6, further comprising electrically isolating the amorphous silicon layer from the first silicon layer.

8. The method of claim 1, wherein the step of providing a second silicon layer comprises selectively epitaxially growing at least a portion of the second silicon layer to create the at least partially crystalline device portion.

9. The method of claim 8, wherein the step of selective epitaxial growth comprises laterally extending the selective epitaxially growth of the second silicon layer so that the second silicon layer grows over at least a portion of the thin-film dielectric to form an overgrowth portion of the second silicon layer.

10. The method of claim 8, further comprising the step of providing an exposed seed surface of the first silicon layer and subsequently selectively epitaxially growing the second silicon layer from the seed surface of the first silicon layer by epitaxial growth of the second silicon layer.

11. The method of claim 10, wherein the step of providing an exposed seed surface comprises the providing of at least one opening through the thin-film dielectric layer.

12. The method of claim 11, further comprising electrically isolating the second silicon layer from the first silicon layer.

13. The method of claim 1, wherein the step of creating a waveguide comprises doping at least a portion of the first silicon layer to form the device portion of the first silicon layer.

14. The method of claim 13, wherein the step of creating a waveguide comprises doping at least a portion of the second silicon layer to form the device portion of the second silicon layer.

15. A method of forming a silicon based thin-film structure for an optical modulator, the method comprising the steps of:
providing a substrate comprising a silicon-on-insulator structure, the silicon-on-insulator structure having a first silicon layer and a buried oxide layer;
depositing a thin-film dielectric layer on the first silicon layer of the substrate, the thin-film dielectric layer having a predetermined thickness;
depositing a second silicon layer on the thin-film dielectric layer;
forming a waveguide having a guiding region, the waveguide comprising at least a portion of the first silicon layer, the thin-film dielectric layer, and the second silicon layer; and
at least partially crystallizing the second silicon layer.

16. The method of claim 15, wherein the first silicon layer comprises single crystal silicon.

17. The method of claim 16, further comprising the step of doping the first silicon layer in at least a portion of the guiding region of the waveguide to form an active region of the first silicon layer.

18. The method of claim 15, wherein the step of depositing a thin-film dielectric layer comprises depositing a silicon dioxide layer.

19. The method of claim 15, wherein the step of depositing a thin-film dielectric layer comprises depositing a dielectric layer having a thickness less than 100 angstroms.

20. The method of claim 15, wherein the step of depositing a second silicon layer comprises depositing an amorphous silicon layer.

21. The method of claim 15, wherein the step of at least partially crystallizing the second silicon layer comprises selectively crystallizing the second silicon layer in at least a portion of the guiding region of the waveguide.

22. The method of claim 15, wherein the step of at least partially crystallizing the second silicon layer comprises thermally processing the second silicon layer.

23. The method of claim 15, wherein the step of at least partially crystallizing the second silicon layer comprises at least partially crystallizing the second silicon layer so that the free carrier mobility of the second silicon layer is at least 20 centimeters$^2$/volt-second at room temperature.

24. The method of claim 23, further comprising the step of doping the second silicon layer in at least a portion of the guiding region of the waveguide to form an active region of the second silicon layer.

25. The method of claim 15, further comprising the step of providing a seed region that can help to at least partially crystallize the second silicon layer.

26. The method of claim 25, wherein the seed region comprises at least a portion of the first silicon layer.

27. The method of claim 26, wherein the step of creating a seed region comprises exposing at least some of the first silicon layer before depositing the second silicon layer to form a seed region that can help to at least partially crystallize the second silicon layer.

28. The method of claim 27, wherein the step of exposing at least some of the first silicon layer comprises providing one or more openings in the thin-film dielectric layer.

29. The method of claim 28, further comprising the step of depositing the second silicon layer on the exposed first silicon layer.

30. A method of forming a silicon based thin-film structure for an optical modulator, the method comprising the steps of:
providing a substrate comprising a silicon-on-insulator structure, the silicon-on-insulator structure having a first silicon layer and a buried oxide layer;
depositing a thin-film dielectric layer on the first silicon layer of the substrate, the thin-film dielectric layer having a predetermined thickness;
selectively epitaxially growing a second silicon layer; and
laterally extending the epitaxially growth of the second silicon layer so that the second silicon layer grows over at least a portion of the thin-film dielectric to form an overgrowth portion of the second silicon layer.

31. The method of claim 30, wherein the first silicon layer comprises a single crystal layer.

32. The method of claim 30, wherein the step of depositing a thin-film dielectric layer comprises depositing a silicon dioxide layer.

33. The method of claim 30, further comprising the step of forming a waveguide having a guiding region, the waveguide capable of guiding light in a propagation direction and comprising at least a portion of the first silicon layer, the thin-film dielectric layer, and the overgrowth portion of the second silicon layer.

34. The method of claim 33, further comprising the step of doping the first silicon layer in at least a portion of the guiding region of the waveguide to form an active region of the first silicon layer.

35. The method of claim 34, further comprising the step of doping the second silicon layer in at least a portion of the guiding region of the waveguide to form an active region of the second silicon layer.

36. The method of claim 33, wherein the step of forming a waveguide comprises extending the waveguide in a predetermined distance in a direction of light propagation in the guiding region of the waveguide.

37. The method of claim 36, wherein the step of selectively epitaxially growing a second silicon layer comprises providing at least one seed region adjacent to the waveguide.

38. The method of claim 37, wherein the step of selectively epitaxially growing a second silicon layer comprises growing the second silicon layer from the at least one seed region.

39. The method of claim 37, wherein the at least one seed region comprises at least a portion of the first silicon layer.

40. The method of claim 37, wherein providing the at least one seed region comprises at least partially exposing the first silicon layer.

41. The method of claim 40, wherein at least partially exposing the first silicon layer comprises forming at least one opening in the thin-film dielectric layer.

42. The method of claim 41, wherein forming at least one opening in the thin-film dielectric layer comprises etching the at least one opening in the thin-film dielectric layer.

43. The method of claim 30, further comprising the step of forming at least one electrical contact to the first silicon layer.

44. The method of claim 43, further comprising the step of forming at least one electrical contact to the second silicon layer.

45. A method of forming a silicon based thin-film structure for an optical modulator, the method comprising the steps of:
providing a substrate comprising a silicon-on-insulator structure, the silicon-on-insulator structure having a first silicon layer and a buried oxide layer;
forming a waveguide having a guiding region, the waveguide capable of guiding light in a propagation direction and extending for a predetermined direction in the propagation direction;
depositing a thin-film dielectric layer having a predetermined thickness on the first silicon layer of the substrate;
selectively epitaxially growing a second silicon layer by initiating growth of the second silicon layer at a seed region spaced apart from the guiding region of the waveguide; and
laterally extending the epitaxially growth of the second silicon layer so that the second silicon layer grows over at least a portion of the thin-film dielectric to form an overgrowth portion of the second silicon layer.

46. The method of claim 45, further comprising the step of forming a seed region by exposing a portion of the first silicon layer to form the seed region.

47. The method of claim 46, wherein exposing a portion of the first silicon layer comprises forming a window in the dielectric thin-film layer.

48. The method of claim 47, forming a window in the dielectric comprises aligning a direction of extension of the window with a crystallographic orientation direction of the first silicon layer.

49. The method of claim 45, wherein the step of forming a waveguide comprises forming a waveguide comprising at least a portion of the first silicon layer, the dielectric thin-film layer, and the overgrowth portion of the second silicon layer.

50. A silicon based thin-film structure for an optical modulator, the thin-film structure comprising:
a substrate comprising a silicon-on-insulator structure, the silicon-on-insulator structure having a first silicon layer and a buried oxide layer;
a thin-film dielectric layer on the first silicon layer of the substrate, the thin-film dielectric layer having a predetermined thickness;
a second silicon layer on the thin-film dielectric; and
a waveguide having a guiding region, the waveguide comprising at least a portion of the first silicon layer, the thin-film dielectric layer, and the second silicon layer;
wherein the second silicon layer is at least partially crystallized in at least a portion of the guiding region of the waveguide.

51. The structure of claim 50, wherein the first silicon layer comprises a single crystal layer.

52. The structure of claim 50, wherein the thin-film dielectric comprises silicon dioxide.

53. The structure of claim 50, wherein the thin-film dielectric comprises a thickness less than 100 angstroms.

54. The structure of claim 50, wherein the waveguide extends in a direction of light propagation for a predetermined distance.

55. The structure of claim 54, wherein the waveguide is designed to guide and confine light having a wavelength in the near infra-red portion of the electromagnetic spectrum.

56. The structure of claim 55, wherein the waveguide is designed to guide and confine light having a wavelength of about 1.55 microns.

57. The structure of claim 50, wherein the waveguide is designed to include an active region capable of modulating light passing through the waveguide at a frequency of at least $1 \times 10^9$ hertz.

* * * * *

UNITED STATES PATENT AND TRADEMARK OFFICE
CERTIFICATE OF CORRECTION

PATENT NO. : 7,177,489 B2  Page 1 of 1
APPLICATION NO. : 10/915299
DATED : February 13, 2007
INVENTOR(S) : Keyser et al.

It is certified that error appears in the above-identified patent and that said Letters Patent is hereby corrected as shown below:

Col. 16, line 25, in Claim 23, replace "20" with --200--

Signed and Sealed this

Twentieth Day of November, 2007

JON W. DUDAS
*Director of the United States Patent and Trademark Office*